United States Patent
Kim

(10) Patent No.: US 9,878,386 B2
(45) Date of Patent: Jan. 30, 2018

(54) ECCENTRIC ELECTRODE FOR ELECTRIC DISCHARGE MACHINING, METHOD OF MANUFACTURING THE SAME, AND MICRO ELECTRIC DISCHARGE MACHINING APPARATUS INCLUDING THE SAME

(71) Applicant: Foundation of Soongsil University-Industry Cooperation, Seoul (KR)

(72) Inventor: Bo Hyun Kim, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 599 days.

(21) Appl. No.: 14/523,808

(22) Filed: Oct. 24, 2014

(65) Prior Publication Data
US 2015/0114937 A1 Apr. 30, 2015

(30) Foreign Application Priority Data

Oct. 31, 2013 (KR) .................. 10-2013-0131234
Dec. 6, 2013 (KR) .................. 10-2013-0151177

(51) Int. Cl.
*B23H 1/04* (2006.01)
*B23H 7/28* (2006.01)

(52) U.S. Cl.
CPC .............. *B23H 1/04* (2013.01); *B23H 7/28* (2013.01)

(58) Field of Classification Search
CPC combination set(s) only.
See application file for complete search history.

(56) References Cited

U.S. PATENT DOCUMENTS

| 3,454,738 A * | 7/1969 | Brookshire | B23H 1/00 219/69.17 |
| 3,939,322 A * | 2/1976 | Bonga | B23H 7/26 204/297.1 |
| 4,819,325 A * | 4/1989 | Cross | B23H 1/04 219/69.15 |

(Continued)

FOREIGN PATENT DOCUMENTS

| JP | H081437 A | 1/1996 |
| JP | H0863231 A | 3/1996 |

(Continued)

*Primary Examiner* — Anne M Antonucci
*Assistant Examiner* — Renee LaRose
(74) *Attorney, Agent, or Firm* — Novick, Kim & Lee, PLLC; Sang Ho Lee

(57) ABSTRACT

Provided are an eccentric electrode for an electric discharge machining apparatus, a method of manufacturing the same, and a micro electric discharge machining apparatus including the same that are capable of generating a micro cylindrical shape on a workpiece with simple operations. The electrode for an electric discharge machining apparatus having a machining head is provided. The electrode includes a first member rotatably attached to the machining head and having a rotation axis, and a second member mounted on the first member, eccentrically disposed with respect to the rotation axis of the first member, and having an inverse tapered shape facing away from the machining head. Accordingly, a conveyance path for machining the object being processed can be simplified to increase its efficiency.

10 Claims, 14 Drawing Sheets

(56) References Cited

U.S. PATENT DOCUMENTS

| | | | | |
|---|---|---|---|---|
| 4,922,076 A * | 5/1990 | Cross | B23H 9/10 | 219/69.15 |
| 4,980,532 A * | 12/1990 | Morishita | B23H 7/20 | 219/69.13 |
| 5,012,063 A * | 4/1991 | Kawanabe | B23H 7/06 | 219/69.12 |
| 5,023,422 A * | 6/1991 | Laughton | B23H 9/10 | 204/224 M |
| 5,183,988 A * | 2/1993 | Takeuchi | B23H 7/20 | 219/69.13 |
| 5,214,260 A * | 5/1993 | Fricke | B23H 7/10 | 219/69.12 |
| 5,313,038 A * | 5/1994 | Kildea | B23H 9/006 | 219/69.15 |
| 5,569,394 A * | 10/1996 | Fukuzawa | B23H 1/00 | 219/69.17 |
| 5,585,013 A * | 12/1996 | Truty | B23H 7/10 | 219/137.61 |
| 5,763,843 A * | 6/1998 | Yuzawa | B23H 7/20 | 200/344 |
| 5,847,348 A * | 12/1998 | Allison | B23H 7/26 | 219/69.11 |
| 6,667,453 B1 * | 12/2003 | Katougi | B23H 7/20 | 219/69.16 |
| 6,683,270 B2 * | 1/2004 | Tsai | B23H 7/26 | 219/69.15 |
| 6,791,055 B1 * | 9/2004 | Katougi | B23H 7/20 | 219/69.13 |
| 6,809,285 B2 * | 10/2004 | Masaki | B23H 1/04 | 219/69.15 |
| 6,998,561 B2 * | 2/2006 | Kato | B23H 7/065 | 219/69.12 |
| 7,202,439 B2 * | 4/2007 | Ishiwata | B23H 1/10 | 137/577 |
| 7,329,825 B2 * | 2/2008 | Awakura | B23H 7/265 | 219/69.15 |
| 7,371,989 B2 * | 5/2008 | Miyajima | B23H 7/065 | 219/69.12 |
| 7,518,081 B2 * | 4/2009 | Miyake | B23H 1/10 | 219/69.15 |
| 7,572,997 B2 * | 8/2009 | Kao | B23H 1/02 | 205/665 |
| 7,576,295 B2 * | 8/2009 | Chen | B23H 7/02 | 219/69.16 |
| 7,645,958 B2 * | 1/2010 | Oda | B23H 1/022 | 219/69.13 |
| 7,652,222 B2 * | 1/2010 | Miki | B23H 1/022 | 219/69.13 |
| 7,923,657 B2 * | 4/2011 | Xidacis | B23H 7/265 | 219/69.15 |
| 7,964,817 B2 * | 6/2011 | MacGregor | B23H 7/26 | 219/69.17 |
| 8,138,441 B2 * | 3/2012 | Forenz | B23H 7/20 | 219/69.16 |
| 2002/0025248 A1 * | 2/2002 | Lee | B23H 9/00 | 415/1 |
| 2002/0113042 A1 * | 8/2002 | Masaki | B23H 1/04 | 219/69.2 |
| 2002/0125217 A1 * | 9/2002 | Kato | B23H 9/14 | 219/69.2 |
| 2002/0148814 A1 * | 10/2002 | Ishiwata | B23H 1/00 | 219/69.2 |
| 2002/0162824 A1 * | 11/2002 | Tricarico | B23H 7/30 | 219/69.17 |
| 2002/0179572 A1 * | 12/2002 | McPhillips | B23H 7/12 | 219/69.2 |
| 2003/0192861 A1 * | 10/2003 | Lin | B23H 9/14 | 219/69.2 |
| 2003/0222053 A1 * | 12/2003 | Tsai | B23H 7/26 | 219/69.15 |
| 2004/0011768 A1 * | 1/2004 | Beaumont | B23H 1/02 | 219/69.17 |
| 2004/0031774 A1 * | 2/2004 | Sugiyama | B23H 1/02 | 219/69.11 |
| 2004/0074876 A1 * | 4/2004 | Varin | B23H 7/265 | 219/69.15 |
| 2004/0149691 A1 * | 8/2004 | Bailey | B23H 9/14 | 219/69.17 |
| 2004/0163254 A1 * | 8/2004 | Miyagawa | B21D 53/84 | 29/890.142 |
| 2004/0164054 A1 * | 8/2004 | Hara | B23H 1/06 | 219/69.15 |
| 2004/0169016 A1 * | 9/2004 | Adachi | B23Q 5/043 | 219/69.15 |
| 2004/0171193 A1 * | 9/2004 | Hayashida | H01L 21/67005 | 438/118 |
| 2004/0200807 A1 * | 10/2004 | Forrester | B23H 7/26 | 219/69.17 |
| 2004/0207382 A1 * | 10/2004 | Lundstrom | G01N 27/043 | 324/71.1 |
| 2004/0211758 A1 * | 10/2004 | Mohri | B23H 1/02 | 219/69.16 |
| 2004/0238497 A1 * | 12/2004 | Meister | B21J 15/50 | 219/69.2 |
| 2004/0256363 A1 * | 12/2004 | Lin | B23H 9/14 | 219/69.15 |
| 2004/0262266 A1 * | 12/2004 | Ishiwata | B23H 1/10 | 219/69.2 |
| 2005/0061682 A1 * | 3/2005 | Lukic | B23H 7/265 | 205/652 |
| 2005/0077269 A1 * | 4/2005 | Yokomichi | B23H 1/10 | 219/69.2 |
| 2005/0082261 A1 * | 4/2005 | Lee | B23H 7/26 | 219/69.11 |
| 2005/0252887 A1 * | 11/2005 | Shih | B23H 9/14 | 219/69.15 |
| 2006/0006150 A1 * | 1/2006 | Hiraishi | B23H 9/14 | 219/69.13 |
| 2006/0054598 A1 * | 3/2006 | Awakura | B23H 7/265 | 219/50 |
| 2006/0231530 A1 * | 10/2006 | Beaumont | B23H 9/14 | 219/69.15 |
| 2006/0289392 A1 * | 12/2006 | Lin | B23H 9/14 | 219/69.15 |
| 2007/0080145 A1 * | 4/2007 | Blocquel | B23H 1/04 | 219/69.11 |
| 2007/0084833 A1 * | 4/2007 | Xidacis | B23H 7/265 | 219/69.15 |
| 2007/0095796 A1 * | 5/2007 | Reed | B23H 1/04 | 219/69.15 |
| 2007/0102402 A1 * | 5/2007 | Miyake | B23H 1/10 | 219/69.15 |
| 2007/0151954 A1 * | 7/2007 | Otsuka | B23H 7/265 | 219/69.15 |
| 2007/0187368 A1 * | 8/2007 | Abraham | B23H 7/26 | 219/69.15 |
| 2007/0228017 A1 * | 10/2007 | Wei | B23H 1/00 | 219/69.14 |
| 2008/0017614 A1 * | 1/2008 | Oda | B23H 1/022 | 219/69.13 |
| 2008/0191187 A1 * | 8/2008 | Lung | G11C 13/0004 | 257/4 |
| 2008/0197115 A1 * | 8/2008 | Miyake | B23H 7/265 | 219/69.11 |
| 2008/0203069 A1 * | 8/2008 | Kao | B23H 1/02 | 219/69.17 |
| 2008/0223828 A1 * | 9/2008 | Forenz | B23H 7/20 | 219/69.15 |
| 2008/0230396 A1 * | 9/2008 | Lee | B23H 3/04 | 205/660 |
| 2008/0272094 A9 * | 11/2008 | Mather | H05H 1/34 | 219/121.52 |
| 2008/0283504 A1 * | 11/2008 | MacGregor | B23H 7/26 | 219/69.12 |
| 2009/0120411 A1 * | 5/2009 | Arnold | B23 3/00 | 123/495 |
| 2009/0200274 A1 * | 8/2009 | Forster | B23H 1/06 | 219/69.15 |

(56) References Cited

U.S. PATENT DOCUMENTS

| | | | | |
|---|---|---|---|---|
| 2009/0208344 A1* | 8/2009 | Jabado | ................... | B23H 9/00 416/97 R |
| 2010/0038259 A1* | 2/2010 | Erdmann | ................ | B23H 3/00 205/686 |
| 2010/0051588 A1* | 3/2010 | Li | .......................... | B23H 7/20 219/69.17 |
| 2010/0108644 A1* | 5/2010 | Berger | .................. | B23B 47/28 219/69.17 |
| 2010/0140226 A1* | 6/2010 | Sheu | ..................... | B23H 1/022 219/69.13 |
| 2010/0193912 A1* | 8/2010 | Speakman | ............... | G03F 1/56 257/618 |
| 2011/0174783 A1* | 7/2011 | Suzuki | .................. | B23H 7/265 219/69.15 |
| 2011/0186550 A1* | 8/2011 | Gannelli | ................. | B23H 1/04 219/69.1 |
| 2012/0132623 A1* | 5/2012 | Justice, Jr. | ............... | B23H 9/14 219/69.15 |
| 2012/0138576 A1* | 6/2012 | Chuang | .................... | B23H 7/02 219/69.12 |
| 2012/0153141 A1* | 6/2012 | Wouters | .................... | B23H 9/14 250/282 |
| 2012/0170988 A1* | 7/2012 | Kountanya | ........... | B23B 27/141 407/119 |
| 2012/0244010 A1* | 9/2012 | Wei | ......................... | B23H 3/00 416/96 R |
| 2012/0285820 A1* | 11/2012 | Li | ........................... | B23H 3/10 204/227 |

FOREIGN PATENT DOCUMENTS

| | | |
|---|---|---|
| JP | 2002254251 A | 9/2002 |
| JP | 2012-056036 A | 3/2012 |
| KR | 10-2005-0042661 A | 5/2005 |
| KR | 10-0574081 B1 | 4/2006 |

* cited by examiner

ECCENTRIC ELECTRODE FOR ELECTRIC DISCHARGE MACHINING, METHOD OF MANUFACTURING THE SAME, AND MICRO ELECTRIC DISCHARGE MACHINING APPARATUS INCLUDING THE SAME

CROSS-REFERENCE TO RELATED APPLICATION

This application claims priority to and the benefit of Korean Patent Application Nos. 10-2013-0131234, filed on Oct. 31, 2013, and 10-2013-0151177, filed on Dec. 6, 2013, the disclosures of which are incorporated herein by reference in their entirety.

BACKGROUND

The present disclosure relates to an eccentric electrode for electric discharge machining to machine a micro shape in a workpiece, a method of manufacturing the same, and a micro electric discharge machining apparatus including the same.

Research on technology of high functional ultra-micro parts in optic digital communication technology, medical environments, and the electronic home appliance industry has been widely performed. Sizes, performance, functions, and so on, of advanced products are restricted by sizes of parts to be machined and machining technologies. Accordingly, a mechanical technology is gradually being varied toward miniaturization, functionalization and diversification.

Presently, a method of machining a micro tool is classified as mechanical machining of physically cutting and machining a workpiece or electric discharge machining using a physical/electrical action. Since mechanical machining involves machining the workpiece through mechanical contact, it is difficult to perform drilling or milling using a large tool. Meanwhile, since micro electric discharge machining has an advantage in that a desired micro hole or shape is machined because there is no physical force applied to a tool to remove stiffness restriction, micro electric discharge machining is used to extremely precisely machine a turbine engine nozzle or an inkjet nozzle, an orifice for a gas or liquid used in aerospace engineering or the medical field, a nuclear fusion measurement apparatus, an X-ray electron gun, a micro connecting section of a high speed computer, fine holes and shapes of a micro turbine, an aircraft engine, and so on.

SUMMARY

The present disclosure is directed to an eccentric electrode for electric discharge machining, a method of manufacturing the same, and a micro electric discharge machining apparatus including the same that are capable of generating a micro cylindrical shape on a workpiece with simple operations.

According to an aspect of the present disclosure, there is provided an eccentric electrode for electric discharge machining rotatably attached to a machining head, the eccentric electrode for electric discharge machining including: a body section attached to the machining head; and an eccentric section eccentrically provided at the body section and having an inversely tapered shape.

The body section may have a cylindrical shape, and the eccentric section may be formed at a position spaced a certain distance from a center of the body section.

In the eccentric section having the inversely tapered shape, a diameter of a cross-section adjacent to the body section may be larger than that of a cross-section opposite to the body section.

A method of manufacturing an eccentric electrode for electric discharge machining includes causing a non-machined tool electrode to approach a plate electrode having a hole to perform electric discharge machining; and performing the electric discharge machining to form the tool electrode having an inversely tapered shape while rotating the tool electrode along a trajectory to increase a trajectory radius when a portion of the tool electrode enters the hole.

The method may further include providing the non-machined tool electrode and the plate electrode in an electric discharge bath; and applying power to both of the non-machined tool electrode and the plate electrode to perform the electric discharge machining.

According to another embodiment of the present disclosure, there is provided a micro electric discharge machining apparatus including: a machining head, a tool electrode attached to the machining head, a conveyance unit configured to support the machining head and perform movement and rotation operations, an electric discharge bath filled with a processing liquid, a work table provided in the electric discharge bath and on which a workpiece is placed, a power supply configured to supply power to the electric discharge bath and the tool electrode, and a control unit configured to generally control the above-mentioned components, wherein the tool electrode is an eccentric electrode for electric discharge machining including a body section attached to the machining head and an eccentric section concentrically formed at one side of the body section, and the eccentric electrode for electric discharge machining has an inversely tapered shape to machine a micro cylindrical shape on a workpiece.

The eccentric section may be eccentrically disposed at a position spaced a certain distance from a center of the body section, and the eccentric section may be vertically lowered and rotated by the conveyance unit to form a micro cylindrical shape on a workpiece.

The control unit may control any one of an operation mode in which a micro cylindrical shape of a workpiece is machined, and an eccentric electrode forming mode in which the tool electrode is machined by the eccentric electrode for electric discharge machining.

The control unit may move the machining head downward in a vertical direction in the operation mode, and rotate an eccentric tool electrode attached to the machining head to form a micro cylindrical shape on the workpiece.

The control unit may machine the eccentric electrode for electric discharge machining having the inversely tapered shape while causing a non-machined tool electrode to approach a plate electrode having a hole and disposed in the electric discharge bath at a certain speed and performing trajectory rotation to increase a trajectory radius as time elapses in the eccentric electrode forming mode.

According to one embodiment of the present disclosure, an electrode for an electric discharge machining apparatus having a machining head is provided. The electrode includes a first member rotatably attached to the machining head and having a rotation axis, and a second member mounted on the first member, eccentrically disposed with respect to the rotation axis of the first member, and having an inverse tapered shape facing away from the machining head. The first member has a cylindrical shape, and the second member is disposed away from the rotation axis of the first member at a predetermined distance.

The inverse tapered shape has a first diameter of a first cross-section adjacent to the first member being smaller than that of a second cross-section facing away from the first member.

According to another embodiment of the present disclosure, a method of manufacturing an electrode for electric discharge machining is provided. The method includes approaching a tool electrode to a plate electrode having a hole to perform the electric discharge machining, and when at least a portion of the tool electrode enters the hole, rotating the tool electrode with respect to a rotation axis along a trajectory on a plane normal to the rotation axis while performing the electric discharge machining for shaping the tool electrode into an inverse tapered form, wherein the trajectory increases a trajectory radius in response to a time.

The method further includes providing the tool electrode and the plate electrode in an electric discharge bath, and applying a power to both of the tool electrode and the plate electrode to perform the electric discharge machining.

According to the other embodiment of the present disclosure, an electric discharge machining apparatus having a machining head, a tool electrode coupled to the machining head, a conveyance unit configured to support the machining head and perform movement and rotation operations of the machining head, an electric discharge bath filled with a processing liquid, a support disposed in the electric discharge bath and configured to accommodate an object being processed, a power supply configured to supply a power to the electric discharge bath and the tool electrode, and a control unit configured to control the electric discharge machining apparatus is provided. The electric discharge machining apparatus includes the tool electrode having, a first member attached to the machining head and having an axis; and a second member eccentrically disposed with respect to the axis of the first member and having an inverse tapered shape, wherein the electrode is configured to form a micro cylindrical shape on the object being processed.

The second member is eccentrically disposed away from the axis of the first member at a predetermined distance, and the second member is configured to be moved downward in a vertical direction and is configured to be rotated by the conveyance unit to form a micro cylindrical shape on the object being processed.

The control unit is configured to control one of a first operation mode in which the micro cylindrical shape is formed on the object being processed, and a second operation mode in which the tool electrode is machined so that the second member is eccentrically disposed with respect to the axis of the first member. The control unit in the first operation mode is configured to move the machining head downward in a vertical direction, and is configured to rotate the tool electrode attached to the machining head to form a micro cylindrical shape on the object being processed.

The control unit in the second operation mode is configured to approach the tool electrode to a plate electrode having a hole therein disposed in the electric discharge bath, and the control unit in the second operation mode is configured to rotate the tool electrode along a trajectory that increases a trajectory radius in response to a time at a predetermined speed so as to shape the tool electrode into an inverse tapered form.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
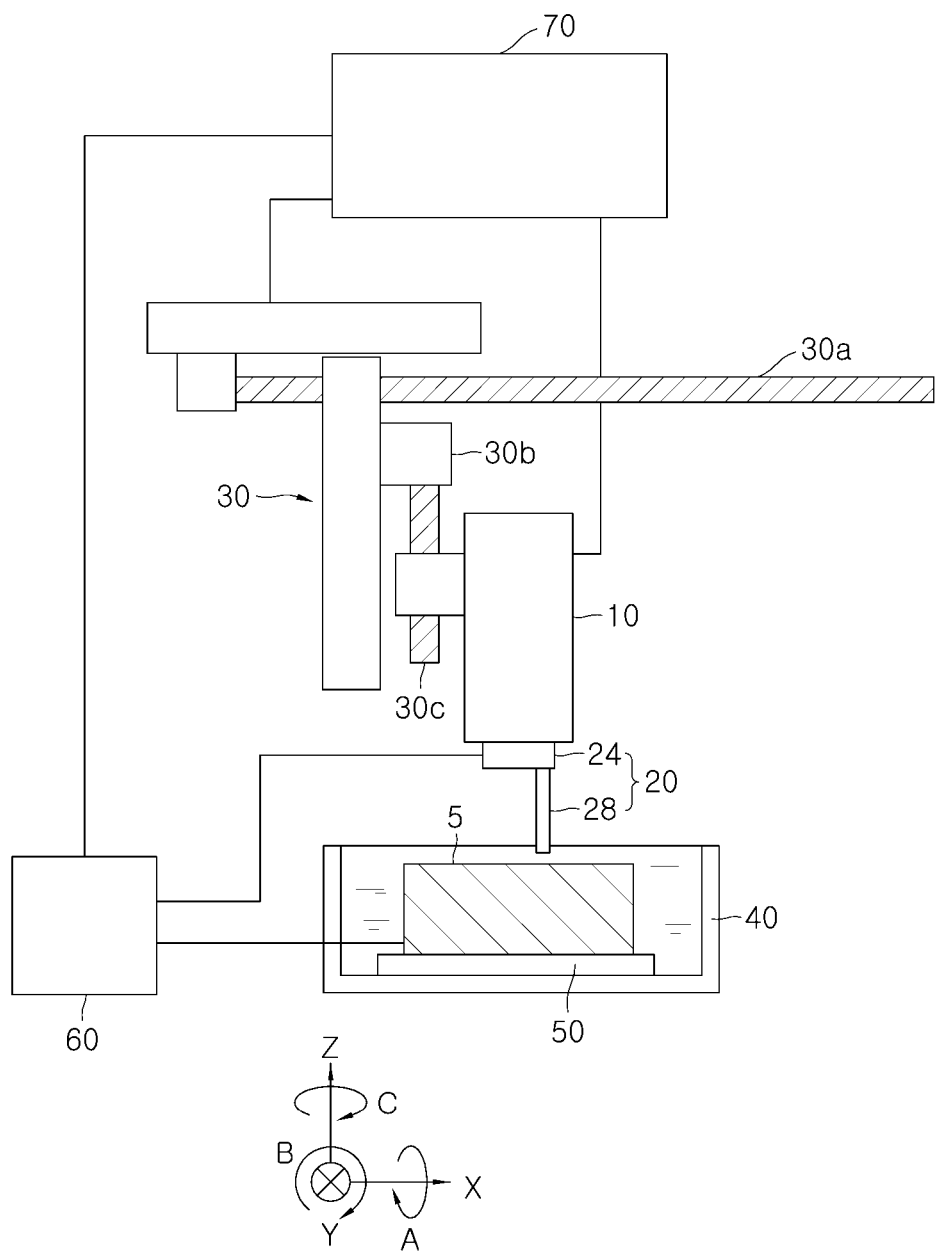
FIG. 1 is a conceptual view of a micro electric discharge machining apparatus according to an embodiment of the present disclosure.

Exemplary embodiments of the present disclosure will be described in detail below with reference to the accompanying drawings. While the present disclosure is shown and described in connection with exemplary embodiments thereof, it will be apparent to those skilled in the art that various modifications can be made without departing from the spirit and scope of the disclosure. Throughout the drawings, like elements are designated by like reference numerals.

FIG. 1 is a conceptual view of a micro electric discharge machining apparatus according to an embodiment of the present disclosure.

First, electric discharge machining by a micro electric discharge machining apparatus 100 will be described, and then a configuration thereof will be described in detail.

The electric discharge machining is a machining method using an electric discharge phenomenon, i.e., a machining method in which a voltage having a high frequency pulse waveform is applied between an electrode and a workpiece to perform electric discharge to remove a surface layer of the workpiece in a desired shape. In other words, the electric discharge machining is a machining method in which a tool electrode and a workpiece are immersed in an insulating processing liquid and an arc electric discharge is continuously generated to remove a portion of the workpiece, and a voltage having a high frequency pulse waveform is applied between the electrode and the workpiece to perform the electric discharge to remove a surface layer of the workpiece.

The micro electric discharge machining apparatus 100 can machine a workpiece with relatively high precision with no restriction in machining, provide a uniform machining surface, and perform a machining operation with no necessity of post processing. The micro electric discharge machining apparatus 100 inserts the electrode and the workpiece into the processing liquid, maintains a small gap between the electrode and the workpiece, and then applies a voltage to the electrode and the workpiece. Accordingly, the electric discharge starts between the electrode and the workpiece, and here, the gap between the electrode and the workpiece is referred to as an electric discharge gap or an electric discharge interval. Here, an extremely large number of pulse waveforms are generated between the electrode and the workpiece by a high frequency pulse power supply, the generated pulse waveforms flow to the shortest point of the workpiece, and electricity having a high current density heats and melts the workpiece. This point is referred to as an electric discharge point. A temperature is rapidly increased at the electric discharge point to generate a high pressure between the electrode and the workpiece to generate an evaporation phenomenon and a vaporization phenomenon. The melted metal of the workpiece can be converted into small grains and can be removed by a flow of the processing liquid.

The micro electric discharge machining apparatus 100 may include a machining head 10 configured to perform the above-mentioned operations, a tool electrode 20 attached to the machining head 10, a conveyance unit 30 configured to support the machining head 10, movable along X, Y and Z axes and rotatable in A, B and C directions, an electric discharge bath 40 filled with a processing liquid, a work table 50 disposed in the electric discharge bath 40 and on which a workpiece is placed, a power supply 60 configured to supply power to the electric discharge bath 40 and the tool electrode 20, and a control unit 70 configured to entirely control the micro electric discharge machining apparatus 100.

The machining head 10 can perform position and posture control of the tool electrode 20 according to a posture control configuration of six degrees of an X axis and a Y axis for controlling a position in a horizontal direction of the tool electrode 20, a Z axis for controlling a position in a vertical direction, and A, B and C axes for controlling rotational angles of the X, Y and Z axes. The machining head 10 is provided with a spindle (not shown) disposed therein to be rotatable by a motor (not shown).

The tool electrode 20 receives power from the power supply 60, and can perform electric discharge machining of the workpiece using the supplied power. The tool electrode 20 is formed in an eccentric shape and can be attached to the machining head 10. When the tool electrode 20 having the eccentric shape (hereinafter referred to as "an eccentric electrode for electric discharge machining") is attached to the machining head 10, the micro cylindrical shape can be formed on the workpiece only by rotation of the machining head 10 and movement in the vertical direction (movement in the Z-axis direction).

The conveyance unit 30 may include an X-axis conveyance frame 30a configured to enable X-axis conveyance, a Y-axis conveyance frame 30b configured to enable Y-axis conveyance, and a Z-axis conveyance frame 30c configured to enable Z-axis conveyance. The X-axis conveyance frame 30a, the Y-axis conveyance frame 30b and the Z-axis conveyance frame 30c provided at the conveyance unit 30 may have rotational angles that can be controlled in the A, B and C directions.

The processing liquid is supplied into the electric discharge bath 40, and the workpiece mounted therein can be machined through the electric discharge machining. While not shown, the electric discharge bath 40 has a hole formed in one corner thereof and configured to discharge the processing liquid.

The work table 50 may be disposed in the electric discharge bath 40 such that the workpiece can be placed thereon. While a workpiece 5 may be directly placed on the horizontally formed work table 50, the workpiece 5 may be placed a certain distance from the work table 50 using a predetermined jig.

The power supply 60 may supply a certain amount of power to the electric discharge bath 40 and the tool electrode 20 when the workpiece is worked on.

The control unit 70 can entirely control the micro electric discharge machining apparatus 100. The control unit 70 can differently control the micro electric discharge machining apparatus 100 in an operation mode in which a micro cylindrical shape of the workpiece is machined, and an eccentric electrode forming mode in which the eccentric electrode 20 for electric discharge machining is formed.

The control unit 70 controls the Z-axis conveyance frame 30c to vertically lower the machining head 10 when the micro columnar shape is formed on the workpiece 5, and rotates a spindle (not shown) disposed in the machining head 10 to rotate the eccentric electrode 20 for electric discharge machining. When the machining head 10 is moved downward, the eccentric electrode 20 for electric discharge machining connected to the machining head 10 approaches the workpiece 5. When the eccentric electrode 20 for electric discharge machining approaches the workpiece 5, the electric discharge machining is performed, and the micro cylindrical shape can be formed according to rotation of the eccentric electrode 20 for electric discharge machining. According to an aspect of the present disclosure, since the eccentric electrode 20 for electric discharge machining is eccentrically provided, movement along the X axis and the Y axis is not performed when the micro columnar shape is formed, and only movement along the Z axis and rotation in the C direction of the tool electrode 20 according to rotation of the spindle (not shown) provided in the machining head 10 are performed.

The control unit 70 controls formation of the eccentric electrode 20 for electric discharge machining according to an electric discharge action between the two electrodes by connecting the non-machined tool electrode 20a to the machining head 10 and installing a plate electrode 80 in the electric discharge bath 40 when the eccentric electrode 20 for electric discharge machining is formed. The control unit 70 can form an eccentric section in a trapezoidal shape as well as a rectangular shape when the eccentric electrode 20 for electric discharge machining is formed, and a specific method thereof will be described below.

Figure 2A:
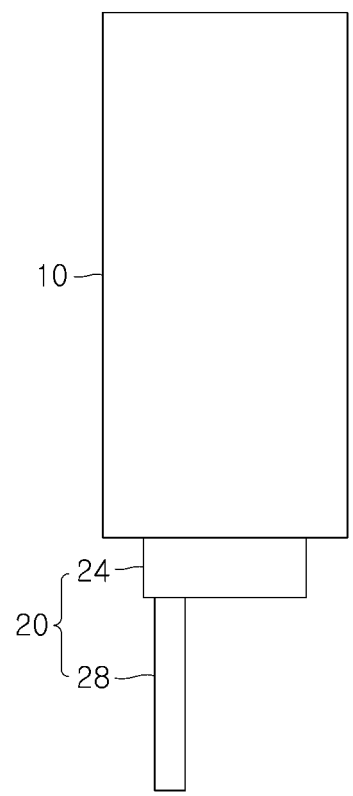
FIGS. 2A to 2C are views for describing a shape and an operation of the eccentric electrode for electric discharge machining according to the embodiment of the present disclosure.
Figure 2B:
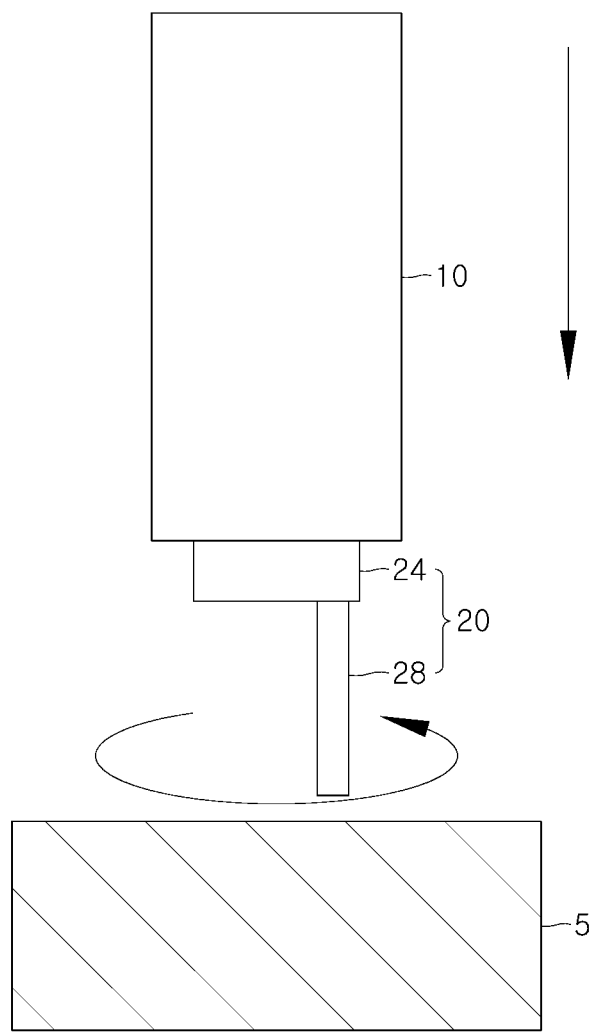
Figure 2C:
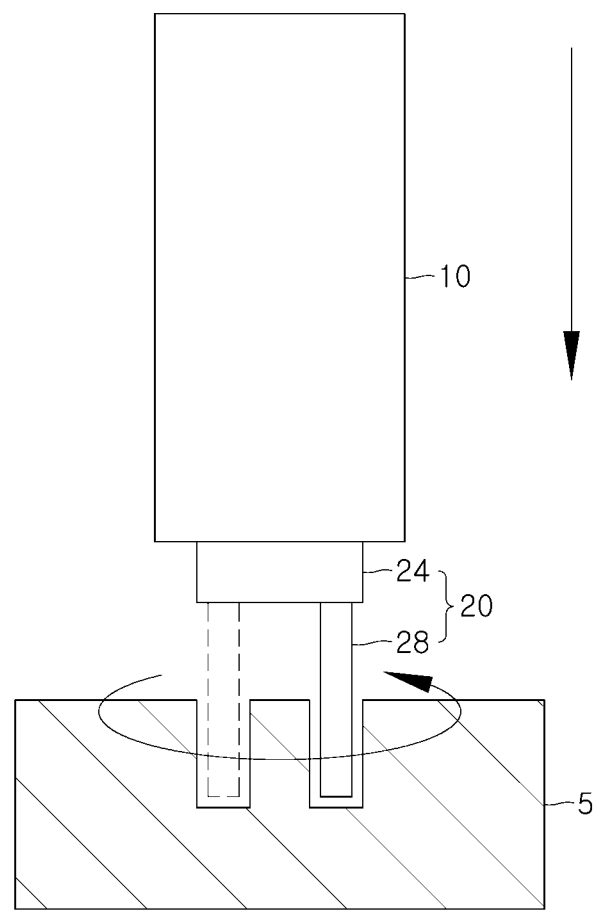

FIGS. 2A to 2C are views for describing a shape and an operation of the eccentric electrode for electric discharge machining according to the embodiment of the present disclosure.

Referring to FIG. 2A, the eccentric electrode 20 for electric discharge machining may include a body section 24 inserted into and attached to the machining head 10 and an eccentric section 28 eccentrically attached to the body section 24. The body section 24 is connected to the spindle (not shown) in the machining head 10 to be rotatable. The eccentric section 28 is attached to a side surface of the body section 24 rather than a center thereof to machine the workpiece 5.

Referring to FIG. 2B, the machining head 10, to which the eccentric electrode 20 for electric discharge machining is attached, moves in the Z-axis direction, and operates the spindle (not shown) disposed therein to rotate the eccentric electrode 20 for electric discharge machining upon movement in the Z-axis direction. Specifically, the machining head 10 gradually moves downward in the vertical direction to rotate the eccentric electrode 20 for electric discharge machining. When the machining head 10 vertically moves downward, an extremely large number of pulse waveforms are generated by the high frequency pulse power supply by the eccentric electrode 20 for electric discharge machining attached to the machining head 10, and the generated pulse waveforms flow toward the shortest point of the workpiece to heat and melt the corresponding position.

Referring to FIG. 2C, since the eccentric electrode 20 for electric discharge machining is inserted into the workpiece 5 while performing the electric discharge machining, it is possible to check formation of the micro cylindrical shape on the workpiece 5.

Figure 3A:
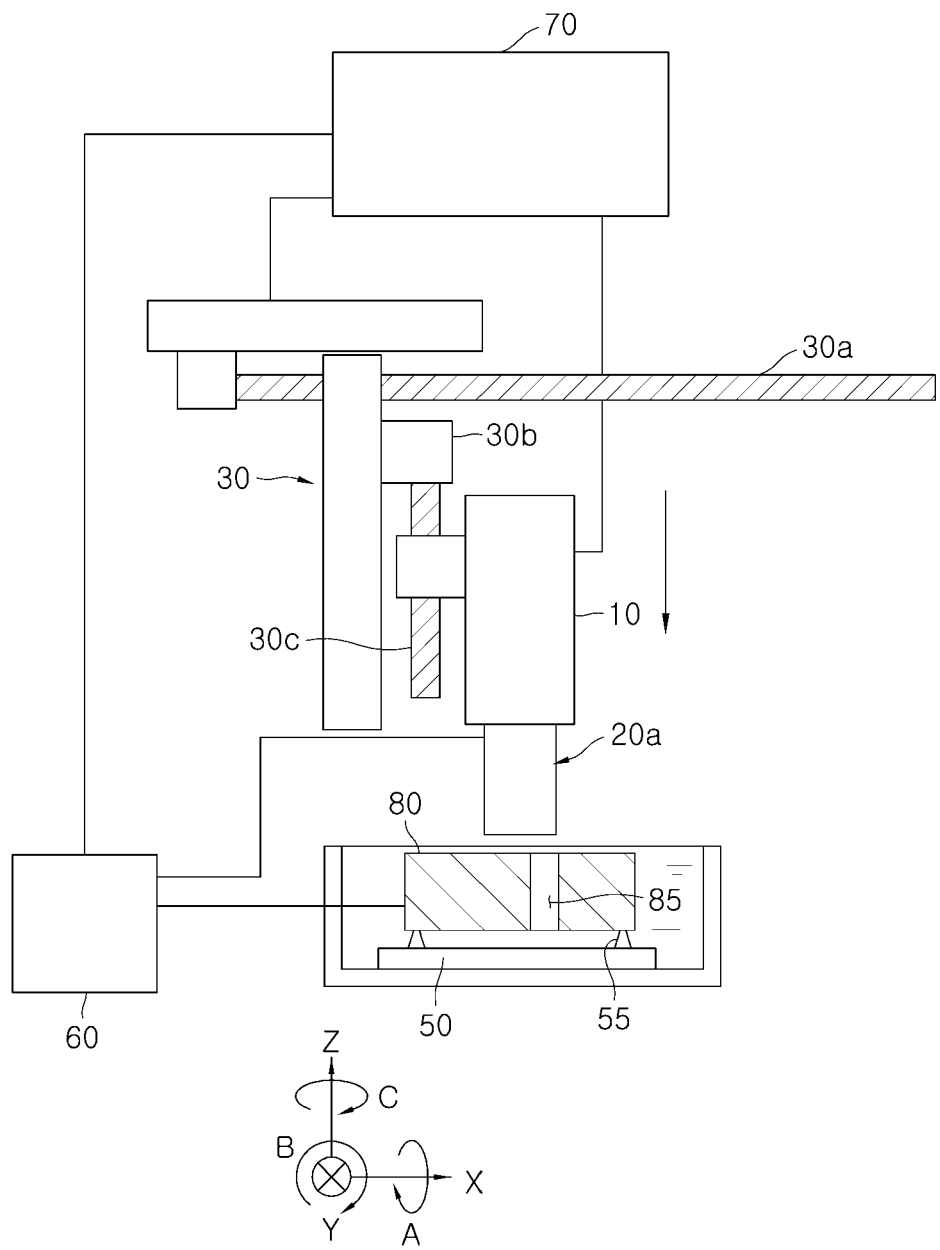
FIGS. 3A to 3C are views for describing a method of manufacturing an eccentric electrode for electric discharge machining according to an embodiment of the present disclosure.
Figure 3B:
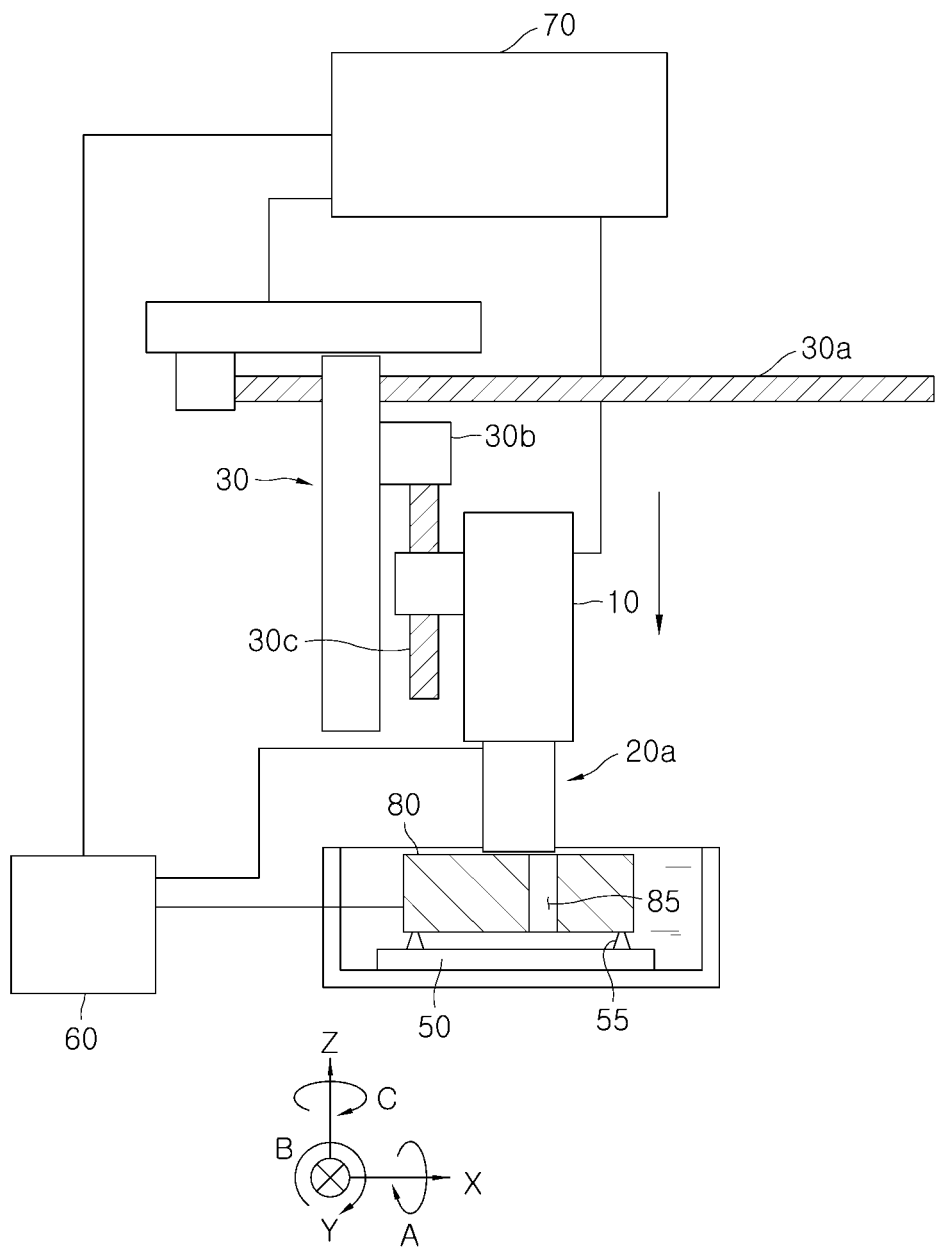
Figure 3C:
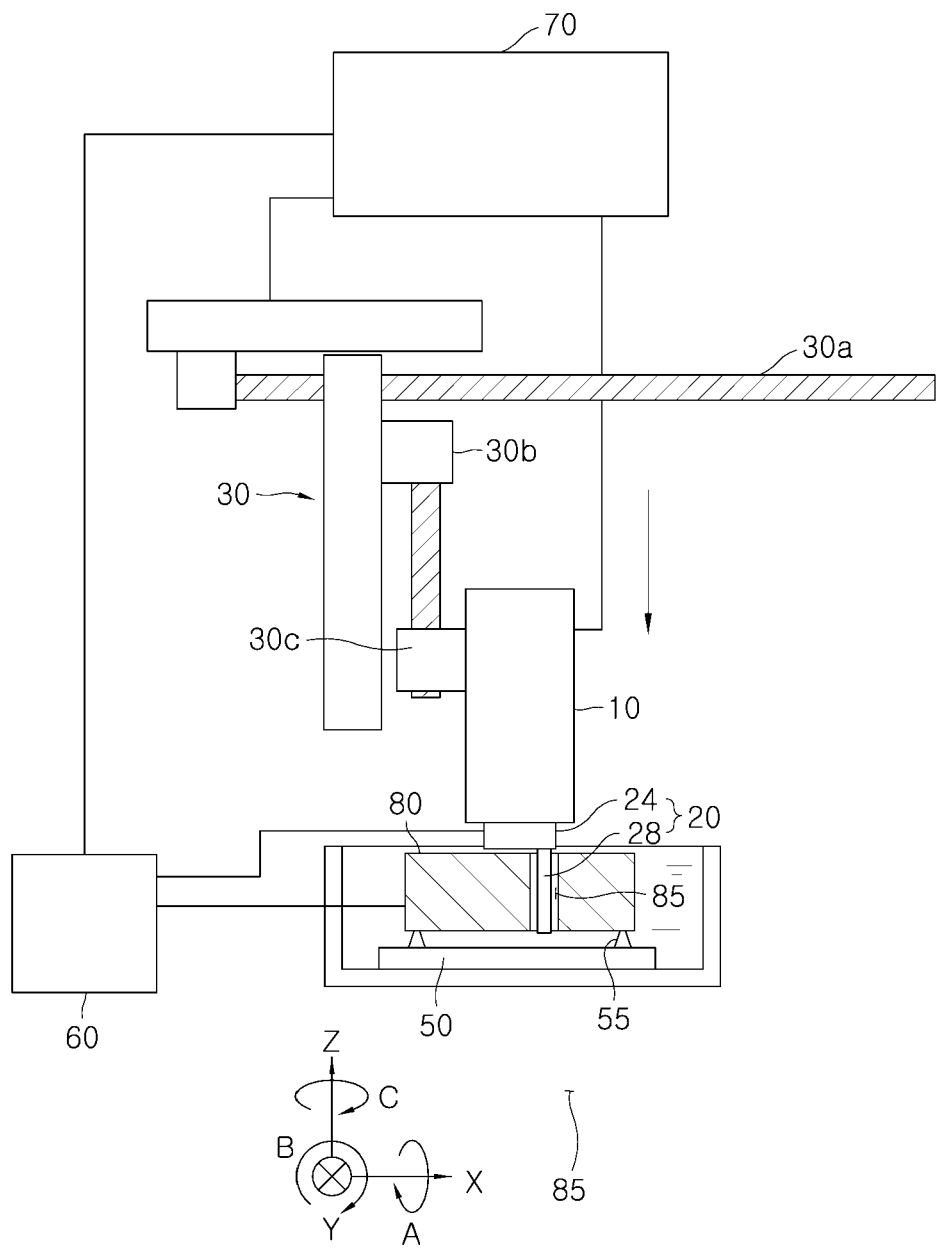

FIGS. 3A to 3C are views for describing a method of manufacturing the eccentric electrode for electric discharge machining according to the embodiment of the present disclosure.

Referring to FIG. 3A, the plate electrode 80 is previously prepared in the electric discharge bath 40, and the non-machined tool electrode 20a is mounted on the machining head 10. The plate electrode 80 is placed on the work table 50 while being spaced a certain distance from the work table 50 using a jig 55 provided at one side. The plate electrode 80 has a hole 85 having a certain size and disposed at one side thereof. The hole 85 formed in the plate electrode 80 has a diameter corresponding to a width of the eccentric electrode 20 for electric discharge machining.

Referring to FIG. 3B, the control unit 70 controls movement of the non-machined tool electrode 20a along the Z axis, and application of power to both of the non-machined electrode 20a and the plate electrode 80.

Referring to FIG. 3C, when a certain time elapses while the non-machined tool electrode 20a moves along the Z axis, the eccentric section 28 is formed to a size of the hole of the plate electrode 80. When the above-mentioned method is used, the eccentric electrode 20 for electric discharge machining including the body section 24 and the eccentric section 28 eccentrically provided at the body section 24 is formed.

Figure 4:
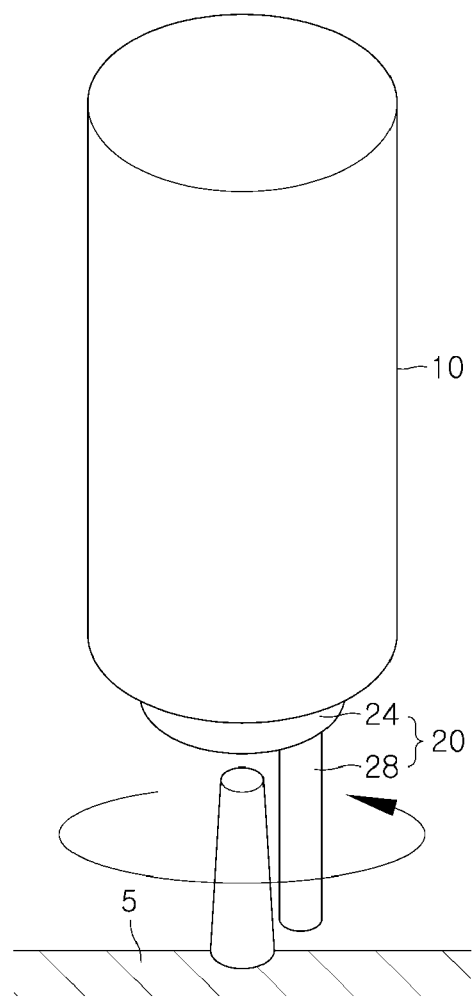
FIG. 4 is a view showing that a micro cylindrical shape is formed on a workpiece using an eccentric electrode 20 for electric discharge machining manufactured through the method of FIGS. 3A to 3C.

FIG. 4 is a view showing that the micro cylindrical shape is formed on the workpiece using the eccentric electrode 20 for electric discharge machining manufactured through the method of FIGS. 3A to 3C.

When the eccentric electrode 20 for electric discharge machining is rotated in the C direction while moving in the Z axis, which is a direction of the workpiece, the micro cylindrical shape is formed. However, the micro cylindrical shape has a frustoconical shape (a tapered shape) due to a reaction with the eccentric electrode 20 for electric discharge machining as shown in FIG. 4. This is caused because a machining time of the eccentric electrode 20 for electric discharge machining that machines a side surface of the micro cylindrical shape is entirely irregular. That is, a diameter of a cross-section of the micro cylindrical shape is smallest (reacted for a longest time) at an initial reaction position (the uppermost cross-section of the workpiece) and largest (reacted for a shortest time) at a reaction termination position (the lowermost cross-section of the workpiece), and thus a micro cylindrical shape having an abnormal form (a tapered shape) is formed. Accordingly, according to the aspect of the present disclosure, the eccentric electrode 20 for electric discharge machining of the micro electric discharge machining apparatus 100 has an inversely tapered shape (a conical shape having a diameter larger at the upper end cross-section than the lower end cross-section), and thus the tapered shape of the micro cylindrical shape of the workpiece can be guided to a cylindrical shape. For example, the inversely tapered shape of 50:1 means that a diameter increases to 1 mm larger than that of a starting point of the cylindrical shape in 50 mm. When the eccentric electrode 20 for electric discharge machining has the inversely tapered shape, it is possible to prevent the micro cylindrical shape of the workpiece 5 from being machined in the tapered shape.

Figure 5:
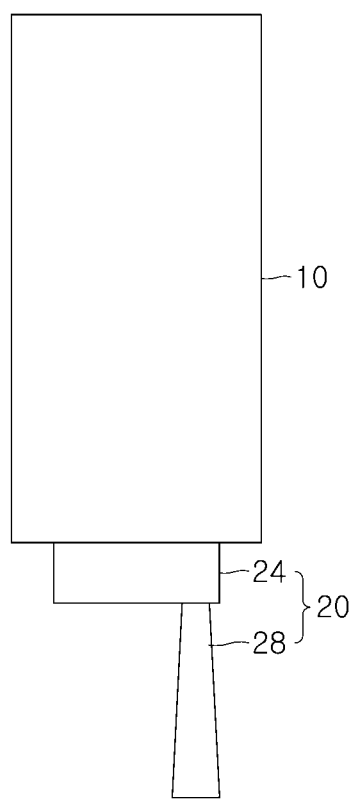
FIG. 5 is a view showing an eccentric electrode for electric discharge machining according to another embodiment of the present disclosure.

FIG. 5 is a view showing an eccentric electrode for electric discharge machining according to another embodiment of the present disclosure.

The eccentric electrode 20 for electric discharge machining may include the body section 24 attached to the machining head 10, and the eccentric section 28 attached to the body section 24 and having the inversely tapered shape.

Since the eccentric section 28 has the inversely tapered shape, when the machining head 10 vertically moves downward and the eccentric electrode 20 for electric discharge machining is inserted into the workpiece 5, a region of the eccentric electrode 20 for electric discharge machining having a relatively large diameter is disposed at the lowermost end of the micro cylindrical shape formed on the workpiece 5 to further cause the electric discharge machining, and a region of the eccentric electrode 20 for electric discharge machining having a relatively small diameter is disposed at the uppermost end of the micro cylindrical shape to cause less of the electric discharge machining, preventing generation of the tapered micro cylindrical shape.

Figure 6A:
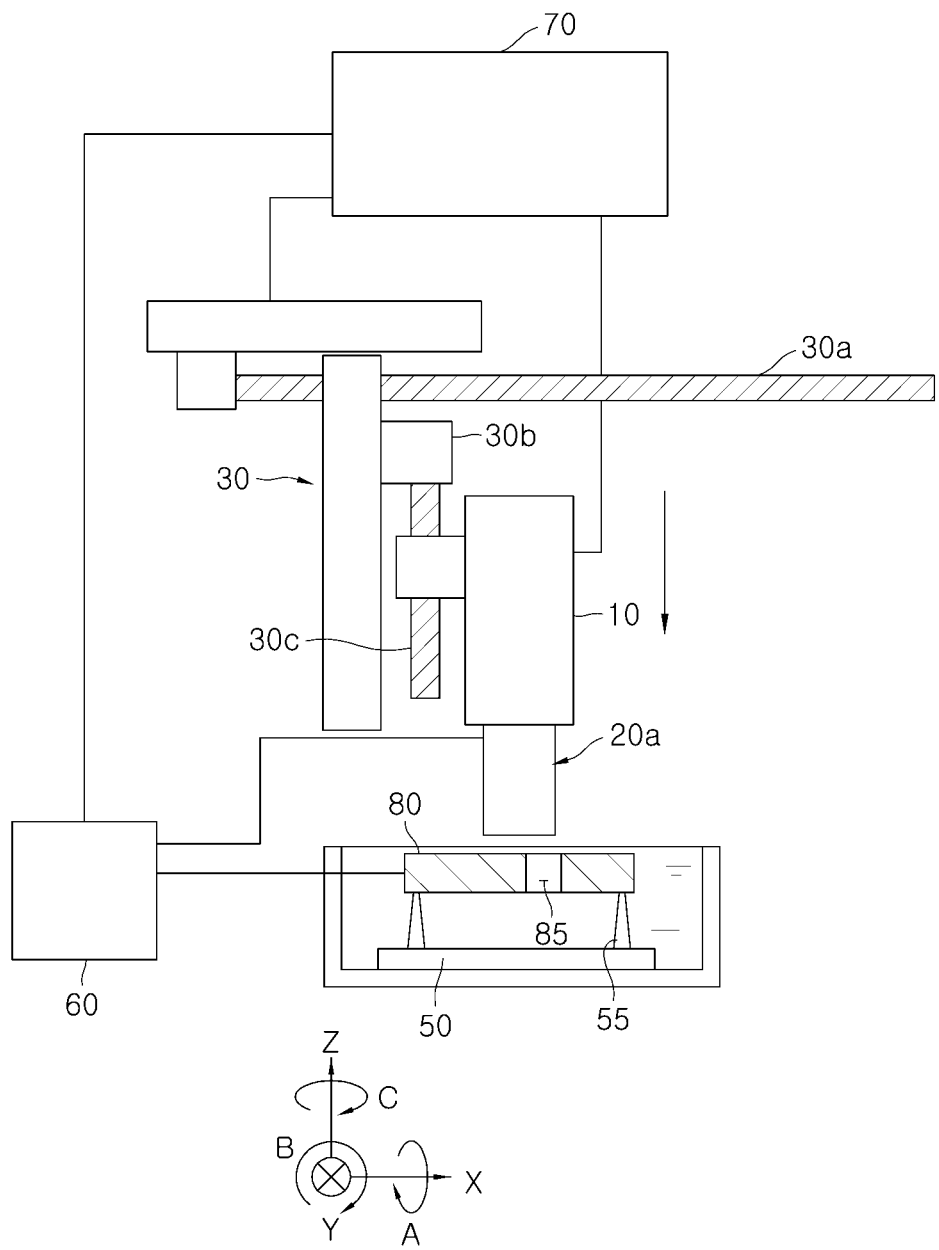
FIGS. 6A to 6C are views showing a method of manufacturing an eccentric electrode for electric discharge machining according to another embodiment of the present disclosure.
Figure 6B:
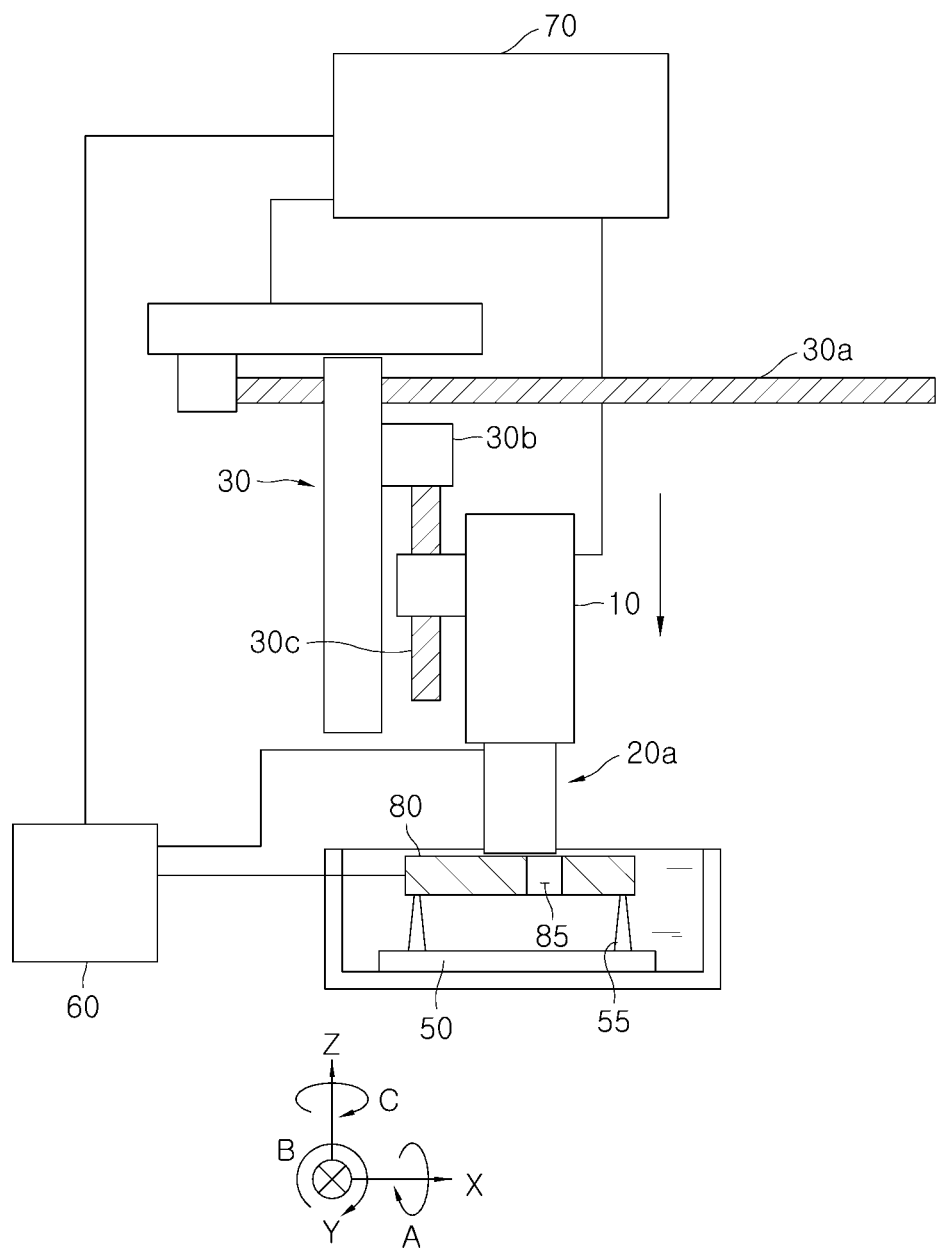
Figure 6C:
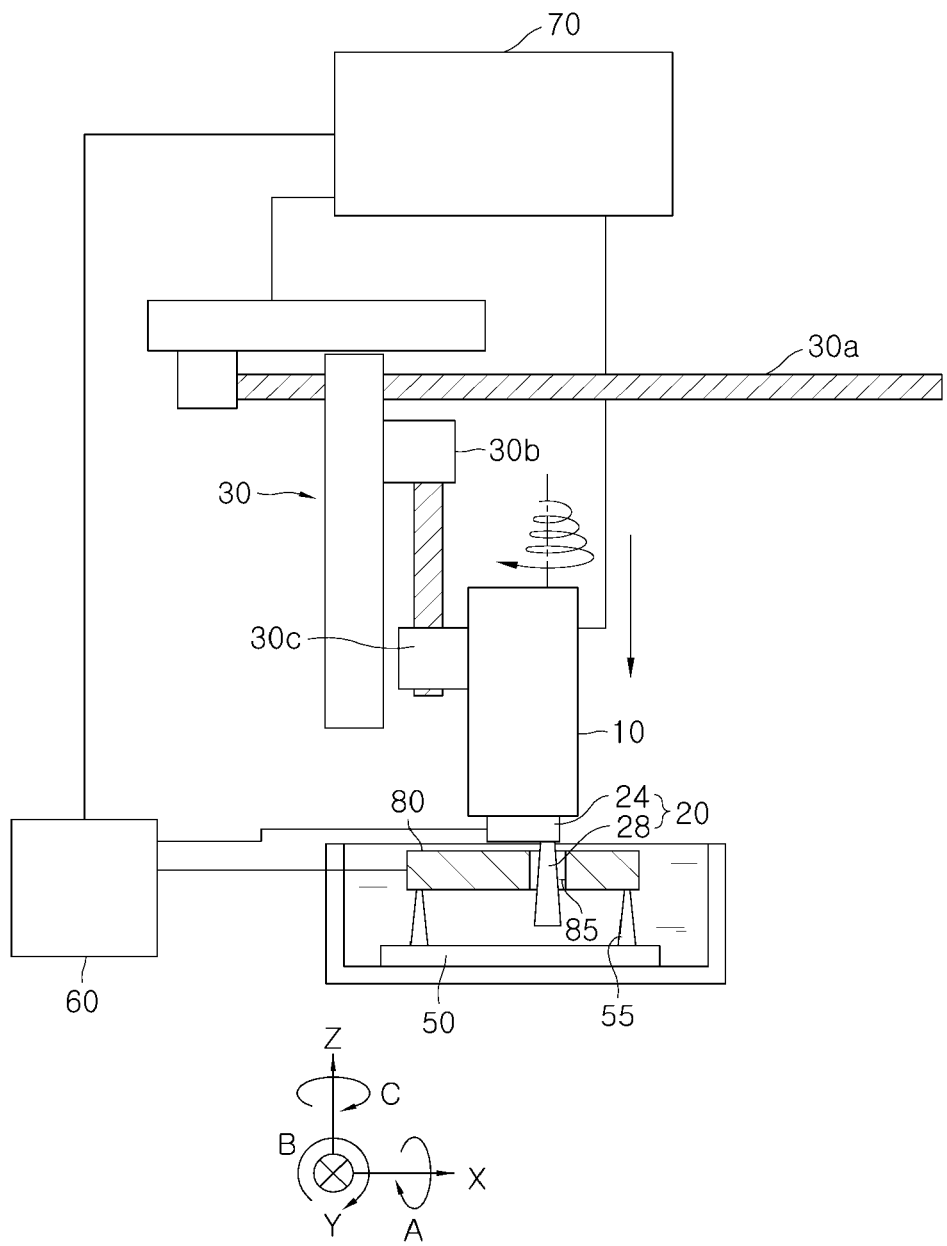

FIGS. 6A to 6C are views showing a method of manufacturing an eccentric electrode for electric discharge machining according to another embodiment of the present disclosure.

Referring to FIG. 6A, like FIG. 3A, the plate electrode 80 is previously prepared in the electric discharge bath 40, and the non-machined tool electrode 20 is mounted on the machining head 10. The plate electrode 80 is placed on the work table 50 while being spaced a certain distance from the work table 50 using the jig 55 provided at one side thereof.

Referring to FIGS. 6B and 6C, the control unit 70 controls movement of the tool electrode 20 along the Z axis, and application of power to both of the tool electrode 20 and the plate electrode 80. The control unit 70 rotates the tool electrode 20 along a trajectory thereof while moving the tool electrode 20 along the Z axis. The control unit 70 performs the trajectory rotation with reference to an eccentric section 28, which is to be generated using the X-axis conveyance frame 30a and the Y-axis conveyance frame 30b upon rotation of the tool electrode. Here, the trajectory rotation with reference to the eccentric section 28 includes performing the trajectory rotation using a center of the hole 85 of the plate electrode 80 as a reference axis. The control unit 70 controls gradual increase of a trajectory radius upon the trajectory rotation. When the trajectory diameter of the trajectory rotation of the non-machined tool electrode 20a is gradually increased in this way, since the electric discharge action is generated relatively less at the region adjacent to the plate electrode 80 (the lowermost region) of the non-machined tool electrode 20a and the adjacent region further approaches an inner wall of the hole of the plate electrode 80 as the diameter of the trajectory rotation is gradually increased, the eccentric electrode 20 for electric discharge machining having the inversely tapered shape having a small diameter of the upper end of the eccentric electrode 20 for electric discharge machining (a portion near the body section) and a large diameter of the lower end (a portion far from the body section) is formed.

Figure 7:
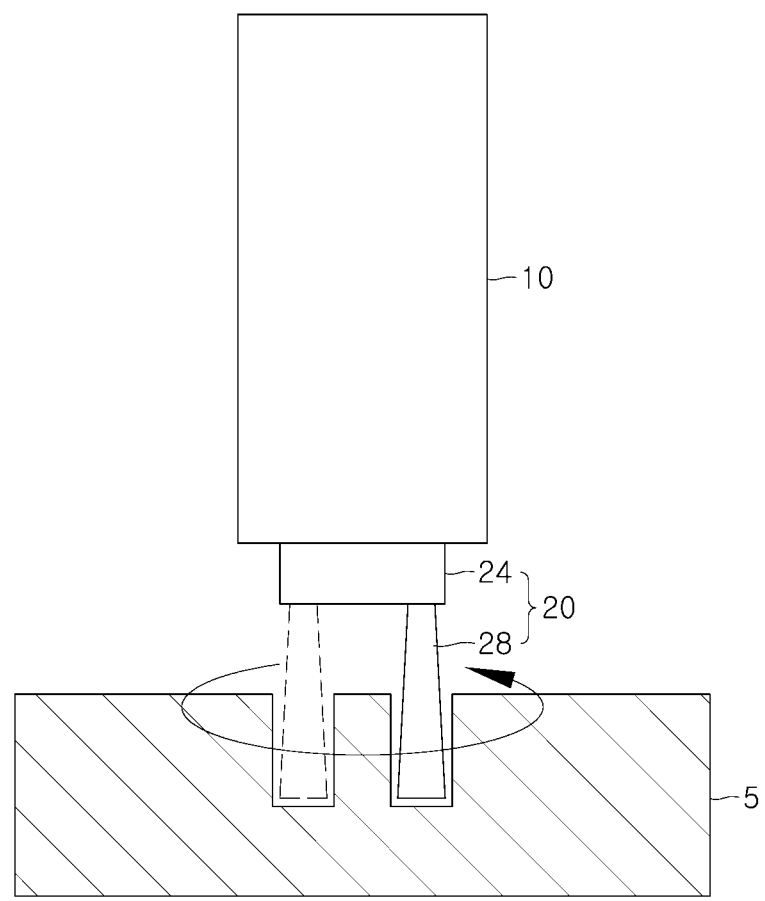
FIG. 7 is a view showing that a micro cylindrical shape is formed by machining a workpiece using the eccentric electrode for electric discharge machining manufactured by the method shown in FIG. 6.
Figure 8:
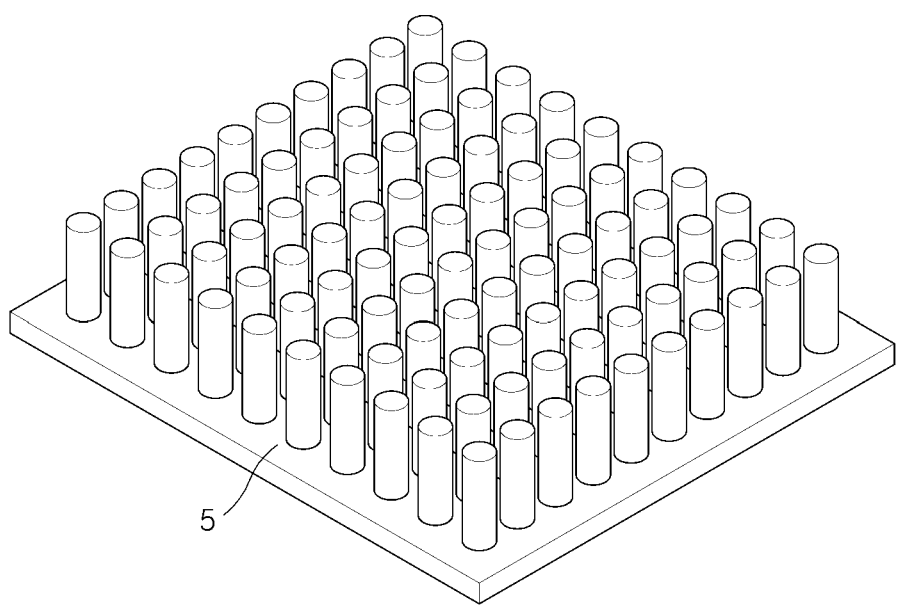
FIG. 8 is a view showing a plurality of micro cylindrical shapes formed on the workpiece manufactured by the method of FIG. 7.

FIG. 7 is a view showing that the micro cylindrical shape is formed by machining the workpiece using the eccentric electrode for electric discharge machining having the inversely tapered shape manufactured by the method shown in FIG. 6, and FIG. 8 is a view showing that a plurality of micro cylindrical shapes are formed on the workpiece by the method shown in FIG. 7.

The eccentric electrode 20 for electric discharge machining may include the body section 24 attached to the machining head 10, and the eccentric section 28 eccentrically attached to one side of the body section 24 through the above-mentioned method. Since the eccentric section 28 has the inversely tapered shape, the micro cylindrical shape of the workpiece can be machined in a cylindrical columnar shape. Specifically, when the eccentric tool electrode 20 having the inversely tapered shape approaches the workpiece 5 to cause the electric discharge action, the upper surface of the workpiece becomes farther from the eccentric tool electrode 20 having the inversely tapered shape as time elapses, and thus further generation of the electric discharge action at the upper end of the workpiece having a relatively longer contact time can be minimized.

As can be seen from the foregoing, since the micro cylindrical shape is formed on the workpiece using the eccentric electrode for electric discharge machining, a conveyance path for machining can be simplified, and time can be saved to improve machining efficiency.

It will be apparent to those skilled in the art that various modifications can be made to the above-described exemplary embodiments of the present disclosure without departing from the spirit or scope of the disclosure. Thus, it is intended that the present disclosure cover all such modifications provided they come within the scope of the appended claims and their equivalents.

What is claimed is:

1. An electrode for an electric discharge machining apparatus having a machining head, the electrode comprising:
   a first member rotatably attached to the machining head and having a rotation axis; and
   a second member mounted on the first member, eccentrically disposed with respect to the rotation axis of the first member, and having an inverse tapered shape facing away from the machining head.

2. The electrode according to claim 1, wherein the first member has a cylindrical shape, and the second member is disposed away from the rotation axis of the first member at a predetermined distance.

3. The electrode according to claim 1, wherein the inverse tapered shape has a first diameter of a first cross-section adjacent to the first member being smaller than that of a second cross-section facing away from the first member.

4. A method of manufacturing an electrode for electric discharge machining, the method comprising:
   approaching a tool electrode to a plate electrode having a hole to perform the electric discharge machining; and
   when at least a portion of the tool electrode enters the hole, rotating the tool electrode with respect to a rotation axis along a trajectory on a plane normal to the rotation axis while performing the electric discharge machining for shaping the tool electrode into an inverse tapered form, wherein the trajectory increases a trajectory radius in response to a time.

5. The method according to claim 4, the method further comprising:
   providing the tool electrode and the plate electrode in an electric discharge bath; and
   applying a power to both of the tool electrode and the plate electrode to perform the electric discharge machining.

6. An electric discharge machining apparatus having a machining head, a tool electrode coupled to the machining head, a conveyance unit configured to support the machining head and perform movement and rotation operations of the machining head, an electric discharge bath filled with a processing liquid, a support disposed in the electric discharge bath and configured to accommodate an object being processed, a power supply configured to supply a power to the electric discharge bath and the tool electrode, and a control unit configured to control the electric discharge machining apparatus, the electric discharge machining apparatus comprising:
   the tool electrode having,
   a first member attached to the machining head and having an axis; and
   a second member eccentrically disposed with respect to the axis of the first member and having an inverse tapered shape, wherein the electrode is configured to form a micro cylindrical shape on the object being processed.

7. The electric discharge machining apparatus according to claim 6, wherein the second member is eccentrically disposed away from the axis of the first member at a predetermined distance, and
   the second member is configured to be moved downward in a vertical direction and is configured to be rotated by the conveyance unit to form a micro cylindrical shape on the object being processed.

8. The electric discharge machining apparatus according to claim 6, wherein the control unit is configured to control one of
   a first operation mode in which the micro cylindrical shape is formed on the object being processed, and
   a second operation mode in which the tool electrode is machined so that the second member is eccentrically disposed with respect to the axis of the first member.

9. The electric discharge machining apparatus according to claim 8, wherein the control unit in the first operation mode is configured to move the machining head downward in a vertical direction, and is configured to rotate the tool electrode attached to the machining head to form a micro cylindrical shape on the object being processed.

10. The electric discharge machining apparatus according to claim 8, wherein the control unit in the second operation mode is configured to approach the tool electrode to a plate electrode having a hole therein disposed in the electric discharge bath, and the control unit in the second operation mode is configured to rotate the tool electrode along a trajectory that increases a trajectory radius in response to a time at a predetermined speed so as to shape the tool electrode into an inverse tapered form.

* * * * *